US010296076B2

(12) United States Patent
Jaffari et al.

(10) Patent No.: US 10,296,076 B2
(45) Date of Patent: May 21, 2019

(54) SUPPLY VOLTAGE DROOP MANAGEMENT CIRCUITS FOR REDUCING OR AVOIDING SUPPLY VOLTAGE DROOPS

(71) Applicant: QUALCOMM Incorporated, San Diego, CA (US)

(72) Inventors: Javid Jaffari, San Diego, CA (US); Amin Ansari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 15/156,156

(22) Filed: May 16, 2016

(65) Prior Publication Data
US 2017/0329391 A1    Nov. 16, 2017

(51) Int. Cl.
*G06F 1/3296* (2019.01)
*G06F 1/08* (2006.01)
(Continued)

(52) U.S. Cl.
CPC .............. *G06F 1/3296* (2013.01); *G06F 1/08* (2013.01); *G06F 1/28* (2013.01); *G06F 1/305* (2013.01);
(Continued)

(58) Field of Classification Search
CPC .......... G06F 1/324; G06F 1/08; G06F 1/3206; G06F 1/04
See application file for complete search history.

(56) References Cited

U.S. PATENT DOCUMENTS 7,437,586 B2 * 10/2008 Cornelius ............... G06F 1/305
327/544
8,618,872 B1 * 12/2013 Sheng .................. H03H 7/0153
327/335
(Continued)

FOREIGN PATENT DOCUMENTS

EP    2887181 A1    6/2015

OTHER PUBLICATIONS

Reddi, Vijay Janapa et al., "Voltage Noise in Production Processors," IEEE micro, IEEE Computer Society, 2011, pp. 20-28.
(Continued)

*Primary Examiner* — Jaweed A Abbaszadeh
*Assistant Examiner* — Alyaa T Mazyad
(74) *Attorney, Agent, or Firm* — W&T/Qualcomm

(57) ABSTRACT

Supply voltage droop management circuits for reducing or avoiding supply voltage droops are disclosed. A supply voltage droop management circuit includes interrupt circuit configured to receive event signals generated by a functional circuit. Event signals correspond to an operational event that occurs in the functional circuit and increases load current demand to a power supply powering the functional circuit, causing supply voltage droop. The interrupt circuit is configured to generate an interrupt signal in response to the received event signal. Memory includes an operational event-frequency table having entries with a target frequency corresponding to an operational event. Operating the functional circuit at target frequency reduces the load current demand on the power supply, and supply voltage droop. A clock control circuit is configured to receive interrupt signal, access memory to determine the target frequency, and generate clock frequency adjustment signal to cause clock generator to adjust to the target frequency.

25 Claims, 9 Drawing Sheets

(51) Int. Cl.
*G06F 1/28* (2006.01)
*G06F 1/30* (2006.01)
*G06F 1/3206* (2019.01)
*G06F 1/324* (2019.01)

(52) U.S. Cl.
CPC ............ *G06F 1/324* (2013.01); *G06F 1/3206* (2013.01); *Y02D 10/126* (2018.01)

(56) References Cited

U.S. PATENT DOCUMENTS

| | | |
|---|---|---|
| 9,164,563 B2 | 10/2015 | Berry, Jr. et al. |
| 2012/0166854 A1 | 6/2012 | Rotem et al. |
| 2012/0187991 A1 | 7/2012 | Sathe et al. |
| 2014/0254734 A1 | 9/2014 | Abdelmoneum et al. |
| 2015/0160975 A1 | 6/2015 | Xu et al. |
| 2015/0214963 A1 | 7/2015 | Liu et al. |
| 2015/0378412 A1 | 12/2015 | Suryanarayanan et al. |
| 2016/0370837 A1* | 12/2016 | Shi .......................... G06F 1/324 |
| 2017/0038814 A1* | 2/2017 | Pal ........................... G06F 1/08 |

OTHER PUBLICATIONS

Reddi, Vijay Janapa et al., "Resilient Architectures via Collaborative Design: Maximizing Commodity Processor Performance in the Presence of Variations," IEEE Transactions on Computer-Aided Design of Integrated Circuits and Systems, vol. 30, No. 10, Oct. 2011, pp. 1429-1445.

International Search Report and Written Opinion for PCT/US2017/027374, dated Jul. 4, 2017, 19 pages.

International Preliminary Report on Patentability for PCT/US2017/027374, dated Aug. 13, 2018, 31 pages.

Second Written Opinion for PCT/US2017/027374, dated Apr. 17, 2018, 11 pages.

* cited by examiner

SUPPLY VOLTAGE DROOP MANAGEMENT CIRCUITS FOR REDUCING OR AVOIDING SUPPLY VOLTAGE DROOPS

BACKGROUND

I. Field of the Disclosure

The technology of the disclosure relates generally to supply voltage droops, and particularly to mitigating effects of supply voltage droops.

II. Background

The power integrity of a circuit design is a metric used to determine if a desired voltage or current is delivered to a particular element in a circuit during operation. For example, the power integrity of a circuit such as a central processing unit (CPU) or digital signal processor (DSP) determines whether a supply voltage needed for circuit functionality is provided to transistors within the circuit. Thus, designing a circuit to achieve a particular level of power integrity plays an important role in circuit design. However, as power and performance requirements of circuit designs continue to increase, such as demand for increased power density, reduced voltage headroom, and increased throughput corresponding to a particular maximum power, achieving a particular level of power integrity becomes more complex.

One factor that negatively affects the power integrity of a circuit is the occurrence of supply voltage droops. A supply voltage droop is a temporary drop or reduction in a supply voltage provided by a power supply to one or more elements in a circuit, such as a transistor. Supply voltage droops may be the result of a drop in supply voltage provided to the power supply, an operational change to the power supply, a surge in power supply current provided by the power supply, or any combination thereof. In particular, a surge in power supply current may be caused by changes in a load current demand of a circuit powered by the power supply.

In this regard, various techniques can be used to reduce or avoid the effects of supply voltage droops in a circuit. For example, circuit elements can be designed to operate within a particular voltage margin relative to the supply voltage. In this manner, circuit elements can achieve desired operation when receiving a voltage that exceeds or falls short of the supply voltage by a particular percentage (i.e., margin), such as +/−10% of the supply voltage. However, such voltage margins are conventionally set to meet worst-case operating conditions, and thus, can increase power consumption and reduce circuit performance. Alternatively, on-die voltage sensors and voltage regulators can be employed to reduce the effects of supply voltage droops. More specifically, on-die voltage sensors can be used to detect a supply voltage droop, while voltage regulators can increase the supply voltage in response to such detection. However, on-die voltage sensors and voltage regulators increase design costs and can reduce circuit performance.

SUMMARY OF THE DISCLOSURE

Aspects disclosed herein include supply voltage droop management circuits for reducing or avoiding supply voltage droops. In one aspect, a supply voltage droop management circuit is provided. The supply voltage droop management circuit includes an interrupt circuit configured to receive event signals generated by a functional circuit clocked by a clock signal at an operating frequency. Each event signal corresponds to an operational event that occurs in the functional circuit. Occurrence of the operational event identified by the event signal increases a load current demand to a power supply powering the functional circuit. Such an increase in the load current demand is sufficient to cause a supply voltage droop in the power supply. To reduce or avoid a supply voltage droop, the interrupt circuit is configured to generate an interrupt signal in response to the received event signal. The interrupt signal includes an operational event indicia identifying the operational event corresponding to the event signal. The supply voltage droop management circuit also includes a memory that employs an operational event-frequency table having multiple entries. Each entry of the operational event-frequency table includes a target frequency corresponding to the operational event identified by the event signal. Operating at the target frequency during the operational event reduces the load current demand of the functional circuit on the power supply, thus reducing the supply voltage droop of the power supply corresponding to the operational event. To achieve the target frequency so as to reduce the supply voltage droop, the supply voltage droop management circuit includes a clock control circuit. The clock control circuit is configured to receive the interrupt signal, and access the operational event-frequency table in the memory based on the operational event indicia of the interrupt signal to determine the target frequency. Using such information, the clock control circuit is configured to generate a clock frequency adjustment signal to cause a clock generator to adjust a frequency of the clock signal to the determined target frequency. In this manner, the supply voltage droop management circuit causes a change in frequency of the clock signal of the functional circuit during the operational event such that supply voltage droops are reduced or avoided.

In this regard in one aspect, a supply voltage droop management circuit is provided. The supply voltage droop management circuit comprises an interrupt circuit. The interrupt circuit is configured to receive an event signal generated by a functional circuit operating based on a clock signal at an operating frequency. The event signal corresponds to an operational event in the functional circuit that increases a load current demand to a power supply powering the functional circuit sufficient to cause a supply voltage droop in the power supply at the operating frequency. The interrupt circuit is further configured to generate an interrupt signal in response to the received event signal. The interrupt signal comprises an operational event indicia identifying the operational event corresponding to the event signal. The supply voltage droop management circuit further comprises a memory. The memory comprises an operational event-frequency table comprising a plurality of entries. Each entry comprises a target frequency corresponding to the operational event corresponding to the event signal. The load current demand on the power supply by the functional circuit reduces the supply voltage droop of the power supply when the functional circuit operates at the target frequency. The supply voltage droop management circuit further comprises a clock control circuit. The clock control circuit is configured to receive the interrupt signal comprising the operational event indicia corresponding to the operational event of the received event signal. The clock control circuit is further configured to access the operational event-frequency table in the memory based on the operational event indicia of the interrupt signal to determine the target frequency corresponding to the operational event. The clock control circuit is further configured to generate a clock frequency adjustment signal to cause a clock generator to adjust a frequency of the clock signal to the determined target frequency.

In another aspect, a supply voltage droop management circuit is provided. The supply voltage droop management circuit comprises a means for receiving an event signal generated by a functional circuit operating based on a clock signal at an operating frequency. The event signal corresponds to an operational event in the functional circuit that increases a load current demand to a power supply powering the functional circuit sufficient to cause a supply voltage droop in the power supply at the operating frequency. The supply voltage droop management circuit further comprises a means for generating an interrupt signal in response to the received event signal. The interrupt signal comprises an operational event indicia identifying the operational event corresponding to the event signal. The supply voltage droop management circuit further comprises a means for storing a plurality of entries, each comprising a target frequency corresponding to the operational event corresponding to the event signal. The load current demand on the power supply by the functional circuit reduces the supply voltage droop of the power supply when the functional circuit operates at the target frequency. The supply voltage droop management circuit further comprises a means for receiving the interrupt signal comprising the operational event indicia corresponding to the operational event of the received event signal. The supply voltage droop management circuit further comprises a means for accessing the means for storing based on the operational event indicia of the interrupt signal to determine the target frequency corresponding to the operational event. The supply voltage droop management circuit further comprises a means for generating a clock frequency adjustment signal to cause a clock generator to adjust a frequency of the clock signal to the determined target frequency.

In another aspect, a method for reducing or avoiding supply voltage droop in a functional circuit is provided. The method comprises receiving an event signal generated by a functional circuit operating based on a clock signal at an operating frequency. The event signal corresponds to an operational event in the functional circuit that increases a load current demand to a power supply powering the functional circuit sufficient to cause a supply voltage droop in the power supply at the operating frequency. The method further comprises generating an interrupt signal in response to the received event signal. The interrupt signal comprises an operational event indicia identifying the operational event corresponding to the event signal. The method further comprises, responsive to the interrupt signal, accessing a target frequency from an entry of a plurality of entries based on the operational event indicia of the interrupt signal to determine the target frequency corresponding to the operational event. The load current demand on the power supply by the functional circuit reduces the supply voltage droop of the power supply when the functional circuit operates at the target frequency. The method further comprises generating a clock frequency adjustment signal to cause a clock generator to adjust a frequency of the clock signal to the determined target frequency.

In another aspect, a processor-based system is provided. The processor-based system comprises a central processing unit (CPU). The CPU comprises a processor, a clock generator configured to generate a clock signal for clocking the CPU, and a supply voltage droop management circuit. The supply voltage droop management circuit comprises an interrupt circuit. The interrupt circuit is configured to receive an event signal generated by the CPU operating based on the clock signal at an operating frequency. The event signal corresponds to an operational event in the CPU that increases a load current demand to a power supply powering the CPU sufficient to cause a supply voltage droop in the power supply at the operating frequency. The interrupt circuit is further configured to generate an interrupt signal in response to the received event signal. The interrupt signal comprises an operational event indicia identifying the operational event corresponding to the event signal. The supply voltage droop management circuit further comprises a memory. The memory comprises an operational event-frequency table comprising a plurality of entries, each entry comprising a target frequency corresponding to the operational event corresponding to the event signal. The load current demand on the power supply by the CPU reduces the supply voltage droop of the power supply when the CPU operates at the target frequency. The supply voltage droop management circuit further comprises a clock control circuit. The clock control circuit is configured to receive the interrupt signal comprising the operational event indicia corresponding to the operational event of the received event signal. The clock control circuit is further configured to access the operational event-frequency table in the memory based on the operational event indicia of the interrupt signal to determine the target frequency corresponding to the operational event. The clock control circuit is further configured to generate a clock frequency adjustment signal to cause the clock generator to adjust a frequency of the clock signal to the determined target frequency.

DETAILED DESCRIPTION

Figure 1A:
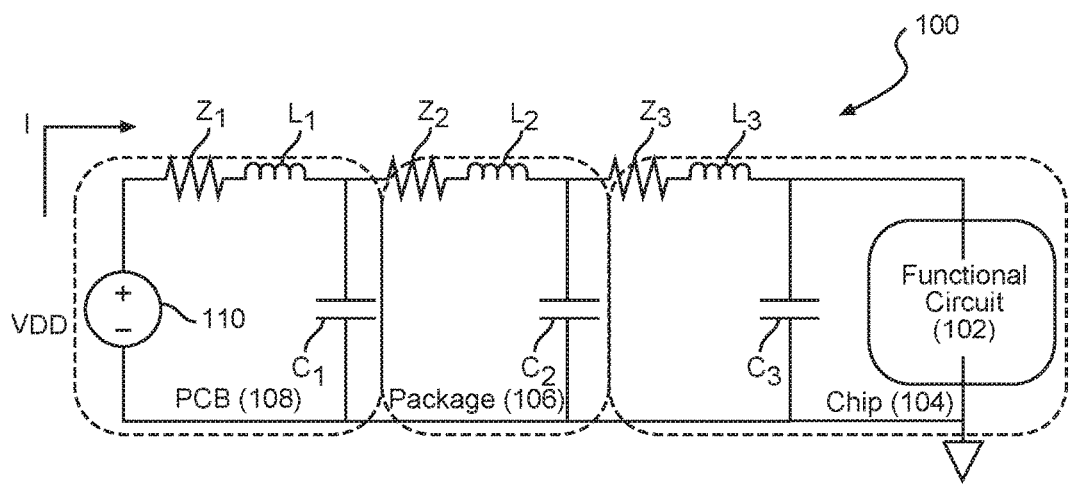
FIG. 1A is a circuit diagram of an exemplary device that experiences supply voltage droops caused by high-frequency current surges.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include supply voltage droop management circuits for reducing or avoiding supply voltage droops. In one aspect, a supply voltage droop management circuit is provided. The supply voltage droop management circuit includes an interrupt circuit configured to receive event signals generated by a functional circuit clocked by a clock signal at an operating frequency. Each event signal corresponds to an operational event that occurs in the functional circuit. Occurrence of the operational event identified by the event signal increases a load current demand to a power supply powering the functional circuit. Such an increase in the load current demand is sufficient to cause a supply voltage droop in the power supply. To reduce or avoid a supply voltage droop, the interrupt circuit is configured to generate an interrupt signal in response to the received event signal. The interrupt signal includes an operational event indicia identifying the operational event corresponding to the event signal. The supply voltage droop management circuit also includes a memory that employs an operational event-frequency table having multiple entries. Each entry of the operational event-frequency table includes a target frequency corresponding to the operational event identified by the event signal. Operating at the target frequency during the operational event reduces the load current demand of the functional circuit on the power supply, thus reducing the supply voltage droop of the power supply corresponding to the operational event. To achieve the target frequency so as to reduce the supply voltage droop, the supply voltage droop management circuit includes a clock control circuit. The clock control circuit is configured to receive the interrupt signal, and access the operational event-frequency table in the memory based on the operational event indicia of the interrupt signal to determine the target frequency. Using such information, the clock control circuit is configured to generate a clock frequency adjustment signal to cause a clock generator to adjust a frequency of the clock signal to the determined target frequency. In this manner, the supply voltage droop management circuit causes a change in frequency of the clock signal of the functional circuit during the operational event such that supply voltage droops are reduced or avoided.

Before addressing exemplary aspects of the present disclosure, details of supply voltage droop are first described. In this regard, FIG. 1A illustrates an exemplary device 100 that experiences supply voltage droops in response to an increase in load current demand of a functional circuit 102. The functional circuit 102 is employed on a corresponding chip 104 that is included in a package 106 disposed on a printed circuit board (PCB) 108. A power supply 110 configured to provide a supply voltage ($V_{DD}$) to the functional circuit 102 is included on the PCB 108. Each portion of the device 100 has a corresponding impedance (Z), inductance (L), and capacitance (C). For example, the PCB 108 includes impedance ($Z_1$), inductance ($L_1$), and capacitance ($C_1$), the package 106 includes impedance ($Z_2$), inductance ($L_2$), and capacitance ($C_2$), and the chip 104 includes impedance ($Z_3$), inductance ($L_3$), and capacitance ($C_3$). Further, a resonance frequency of the device 100 is based, at least partially, on the combined impedance ($Z_1$-$Z_3$), inductance ($L_1$-$L_3$), and capacitance ($C_1$-$C_3$). In response to an increased load current demand by the functional circuit 102, the supply voltage ($V_{DD}$) provided by the power supply 110 can experience a temporary reduction in magnitude (i.e., a supply voltage droop). The size and duration of such a supply voltage droop is a function of the resonance frequency of the device 100, in conjunction with the frequency of the current (I) provided by the power supply 110. In particular, a surge in the current (I) provided at a frequency approximately equal to the resonance frequency can cause a large supply voltage droop over a short period of time.

Figure 1B:
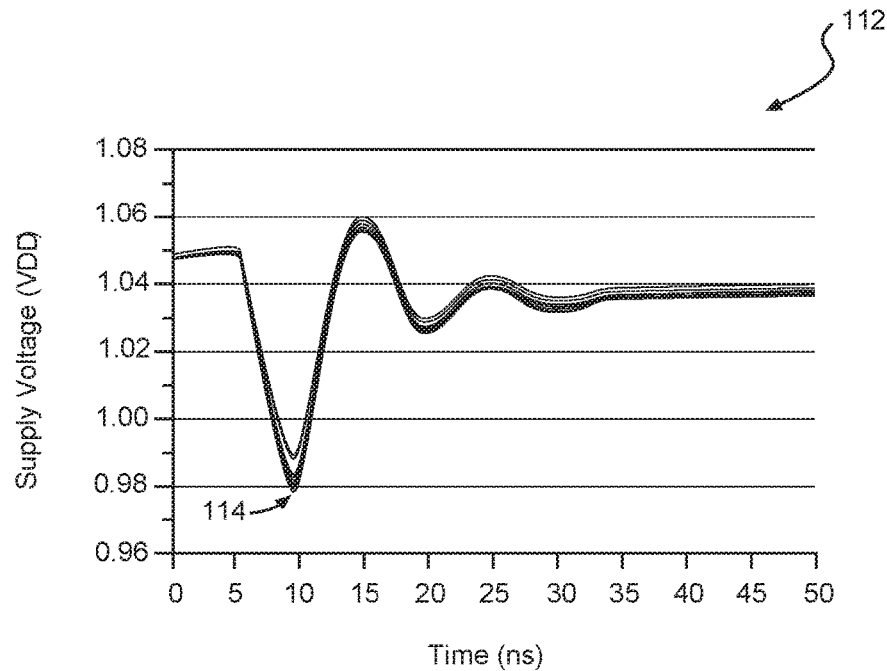
FIG. 1B is a graph illustrating a supply voltage droop caused by a high frequency current surge in the exemplary device in FIG. 1A.

In this regard, FIG. 1B includes a graph 112 illustrating a supply voltage droop 114 experienced by the device 100 in FIG. 1A. The supply voltage droop 114 is caused by a surge in the current (I) provided by the power supply 110 at a frequency approximately equal to the resonance frequency of the device 100, which is one hundred Mega-Hertz (100 MHz) in this example. As illustrated in the graph 112, the supply voltage droop 114 corresponds to a drop in the supply voltage ($V_{DD}$) of approximately seventy millivolts (70 mV) over the course of approximately five nanoseconds (5 ns) (e.g., starting around 5 ns and having a maximum droop around 10 ns). While conventional reactive techniques, such as on-die voltage sensors and voltage regulators, may reduce the effects of supply voltage droops corresponding to the current (I) at frequencies lower than the resonance frequency, such techniques may not be able to respond quickly enough to mitigate supply voltage droops corresponding to surges in the current (I) at a frequency approximately equal to the resonance frequency of 100 MHz. In particular, in this example, on-die voltage sensors and voltage regulators may not be able to detect the supply voltage droop 114 and regulate the supply voltage ($V_{DD}$) effectively over the course of 5 ns.

Figure 2:
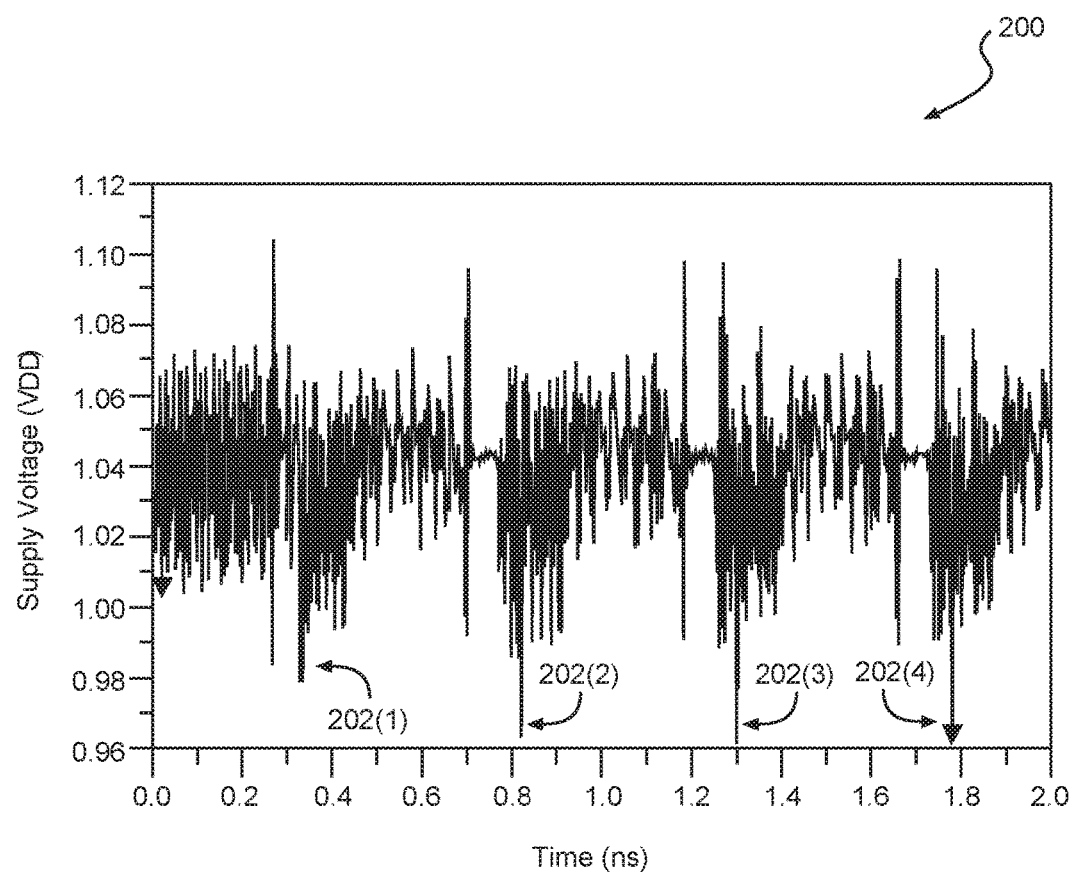
FIG. 2 is a graph illustrating supply voltage droops generated during a simulation of an exemplary central processing unit (CPU)

Additionally, surges in the current (I) at a frequency approximately equal to the resonance frequency of a circuit causing supply voltage droops can correspond to particular operational events that occur in functional circuits. For example, operational events that take place in a central processing unit (CPU), such as branch miss predictions and cache misses, may cause corresponding surges in current (I) approximately equal to the resonance frequency of the CPU. In this regard, FIG. 2 includes a graph 200 of supply voltage droops 202(1)-202(4) generated during a simulation of an exemplary CPU executing sample instructions. As illustrated in the graph 200, during the period from zero (0) ns to two (2.0) ns, the CPU experiences supply voltage droops 202(1)-202(4). The regularity with which the supply voltage droops 202(1)-202(4) occur suggests that one or more operational events occurring in the CPU may contribute to the supply voltage droops 202(1)-202(4). Such a correlation between operational events related to supply voltage droops caused by surges in the current (I) at a frequency approximately equal to the resonance frequency of the CPU can be used to reduce or avoid such supply voltage droops.

Figure 3:
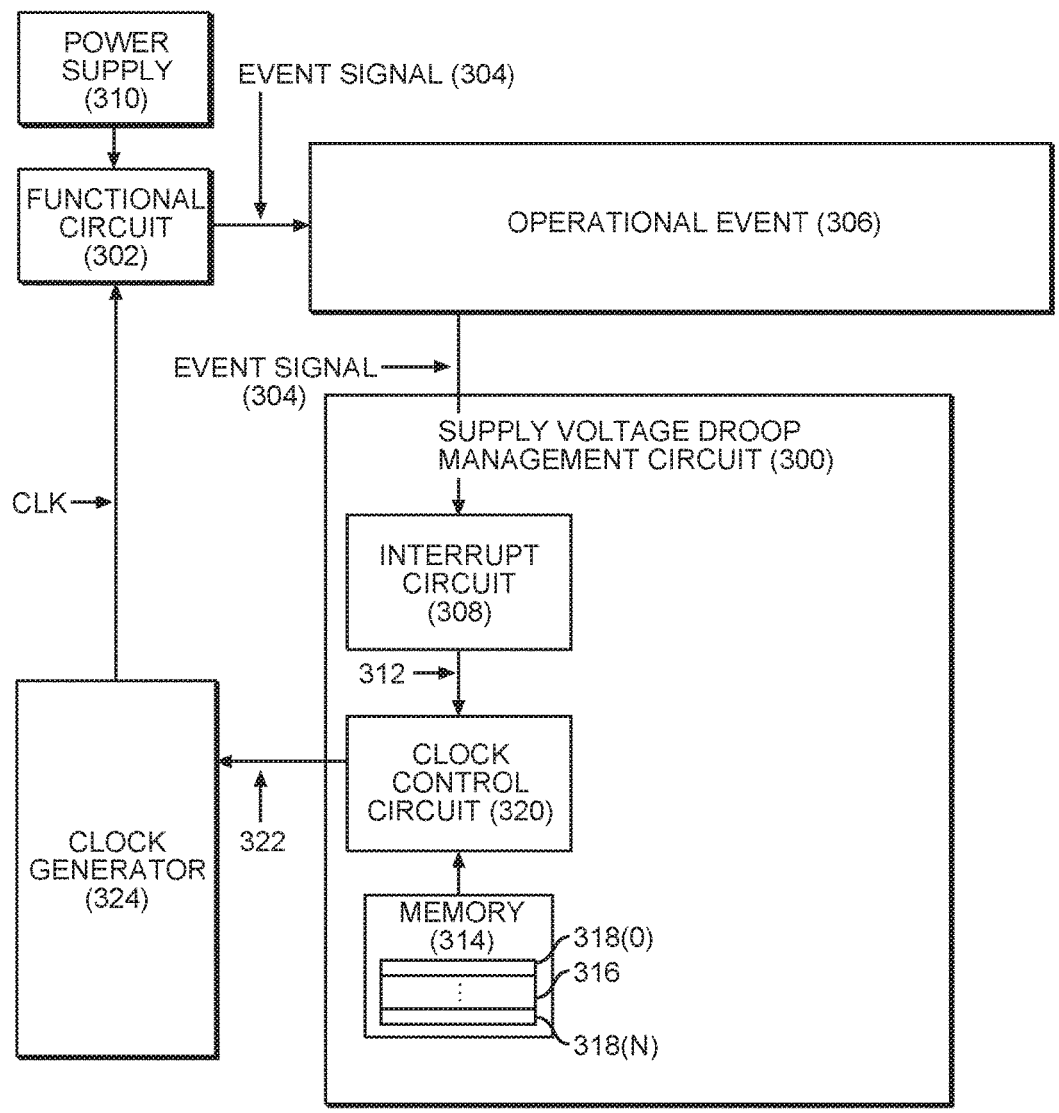
FIG. 3 is a block diagram of an exemplary supply voltage droop management circuit configured to reduce or avoid supply voltage droops in a functional circuit in response to an event signal corresponding to an operational event.

In this regard, FIG. 3 illustrates an exemplary supply voltage droop management circuit 300 configured to reduce or avoid supply voltage droops in a functional circuit 302 in response to an event signal 304 corresponding to an operational event 306. The supply voltage droop management circuit 300 includes an interrupt circuit 308 configured to receive the event signal 304 generated by the functional circuit 302 clocked by a clock signal CLK at an operating frequency ($f_{OP}$). Each event signal 304 corresponds to an operational event 306 occurring in the functional circuit 302 that increases a load current demand to a power supply 310 powering the functional circuit 302. Such an increase in the load current demand is sufficient to cause a supply voltage droop in the power supply 310 at the operating frequency ($f_{OP}$). The correlation between the event signal 304 and the corresponding operational event 306 that increases the load current demand may be determined during the design and test phase of the functional circuit 302. For example, an operational event 306, such as a branch miss prediction, private cache miss, vector instruction, or execution unit utilization may be determined to cause increases in the load current demand when performing a power integrity test on the functional circuit 302.

With continuing reference to FIG. 3, to reduce or avoid a supply voltage droop, the interrupt circuit 308 is configured to generate an interrupt signal 312 in response to the received event signal 304. The interrupt signal 312 includes operational event indicia identifying the operational event 306 corresponding to the event signal 304. Additionally, the supply voltage droop management circuit 300 includes a memory 314. The memory 314 includes an operational event-frequency table 316 having multiple entries 318(0)-318(N), each of which includes a target frequency ($f_T$) corresponding to the operational event 306 identified by the event signal 304. In response to the functional circuit 302 operating at the target frequency ($f_T$) during the operational event 306, the load current demand on the power supply 310 by the functional circuit 302 is reduced. Reducing the load current demand in this manner reduces the magnitude of the supply voltage droop of the power supply 310 related to the operational event 306.

With continuing reference to FIG. 3, to achieve the target frequency ($f_T$) so as to reduce the supply voltage droop, the supply voltage droop management circuit 300 includes a clock control circuit 320. The clock control circuit 320 is configured to receive the interrupt signal 312 and access the operational event-frequency table 316 in the memory 314. The operational event-frequency table 316 can be accessed based on the operational event indicia of the interrupt signal 312 to determine the target frequency ($f_T$) of the corresponding operational event 306. Using such information, the clock control circuit 320 is configured to generate a clock frequency adjustment signal 322 to cause a clock generator 324 to adjust the frequency of the clock signal CLK to the determined target frequency ($f_T$). The clock frequency adjustment signal 322 may indicate a particular clock rate (e.g., the target frequency ($f_T$)) to which clock signal CLK should be set. As a result, the clock frequency adjustment signal 322 may cause the clock generator 324 to perform clock stretching or clock swallowing of the clock signal CLK to reduce the frequency of the clock signal CLK to the target frequency ($f_T$).

Reducing the clock signal CLK to the target frequency ($f_T$) reduces the speed at which the functional circuit 302 operates during the operational event 306. As a result, a corresponding increase in load current demand by the functional circuit 302 is reduced, which reduces the frequency of an increased current provided by the power supply 310. The reduced frequency of the increased current provided by the power supply 310 reduces the magnitude of the supply voltage droop. In this manner, the supply voltage droop management circuit 300 causes a change in the frequency of the clock signal CLK of the functional circuit 302 corresponding to the operational event 306 such that the corresponding supply voltage droop is reduced or avoided.

With continuing reference to FIG. 3, the event signal 304 may be configured to identify an operational event 306 that occurs concurrently with the event signal 304. Alternatively, the event signal 304 may also be configured to identify an operational event 306 that occurs at a future time following occurrence of the event signal 304. In particular, if the event signal 304 identifies a future operational event 306, the supply voltage droop management circuit 300 is configured to adjust the frequency of the clock signal CLK prior to occurrence of the operational event 306 so as to reduce or avoid the corresponding supply voltage droop. By configuring the event signal 304 to identify a future operational event 306, the supply voltage droop management circuit 300 can predict potential supply voltage droops and adjust the clock signal CLK in advance.

Figure 4:
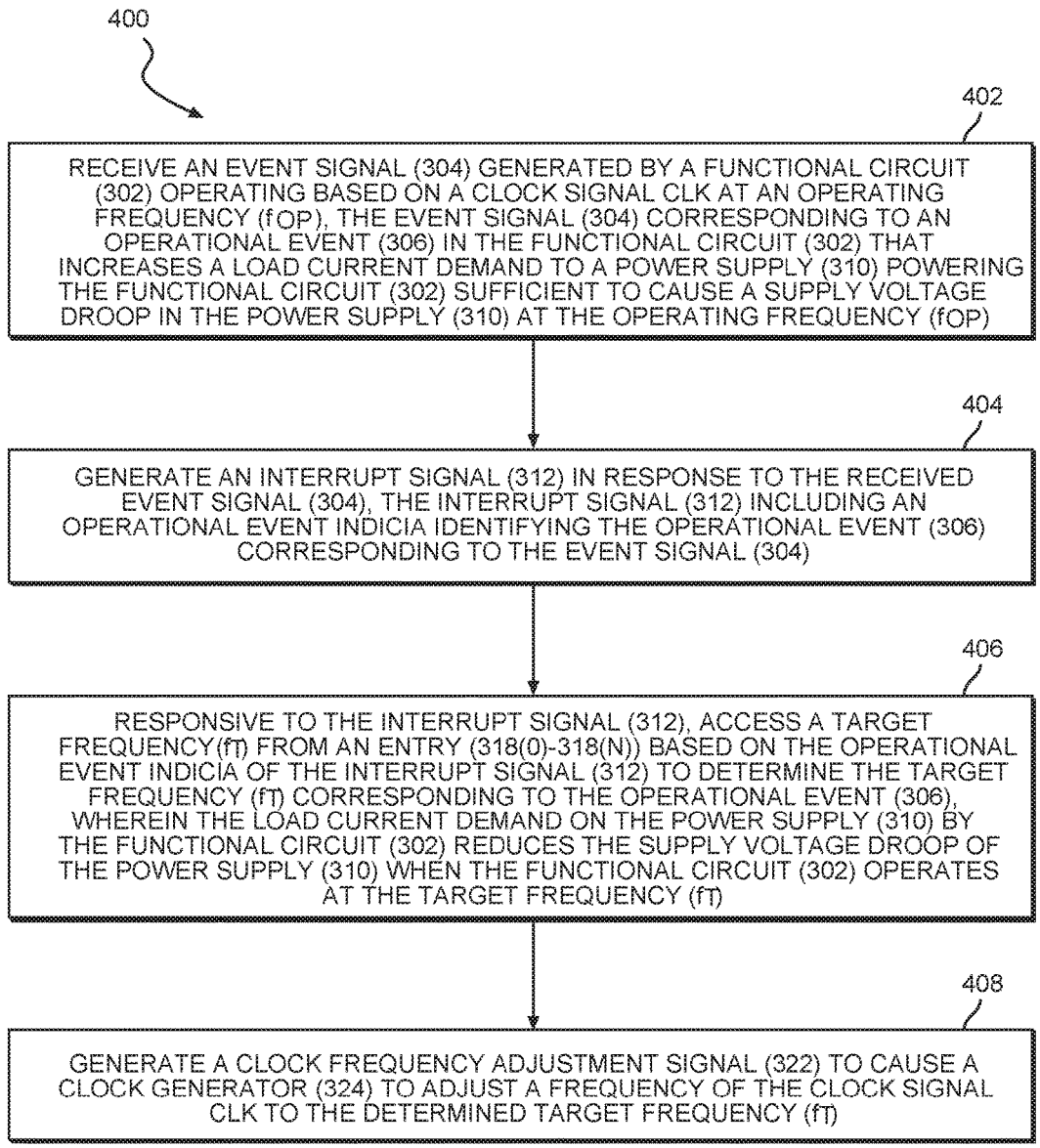
FIG. 4 is a flowchart of an exemplary process employed by the supply voltage droop management circuit in FIG. 3 for reducing or avoiding supply voltage droops in the functional circuit.

FIG. 4 illustrates an exemplary process 400 for reducing or avoiding supply voltage droop using the supply voltage droop management circuit 300 in FIG. 3. The process 400 includes the interrupt circuit 308 receiving the event signal 304 generated by the functional circuit 302 operating based on the clock signal CLK at the operating ($f_{OP}$) (block 402). As previously described, the event signal 304 corresponds to an operational event 306 in the functional circuit 302 that increases a load current demand to the power supply 310 powering the functional circuit 302 sufficient to cause a supply voltage droop in the power supply 310 at the operating frequency ($f_{OP}$). The process 400 also includes the interrupt circuit 308 generating the interrupt signal 312 in response to the received event signal 304 (block 404). As described above, the interrupt signal 312 includes operational event indicia identifying the operational event 306 corresponding to the event signal 304. The process 400 also includes responsive to the interrupt signal (312), the clock control circuit 320 accessing a target frequency ($f_T$) from an entry 318(0)-318(N) based on the operational event indicia of the interrupt signal 312 to determine the target frequency ($f_T$) corresponding to the operational event 306 (block 406). As noted above, the load current demand on the power supply 310 by the functional circuit 302 reduces the supply voltage droop of the power supply 310 when the functional circuit 302 operates at the target frequency ($f_T$). The process 400 further includes the clock control circuit 320 generating the clock frequency adjustment signal 322 to cause the clock generator 324 to adjust the frequency of the clock signal CLK to the determined target frequency ($f_T$) (block 408). Employing the process 400 in this manner allows the supply voltage droop management circuit 300 to cause a change in the frequency of the clock signal CLK of the functional circuit 302 during the operational event 306 such that a corresponding supply voltage droop is reduced or avoided.

With reference to FIGS. 3 and 4, as a non-limiting example, the interrupt circuit 308 receives an event signal 304 having operational event indicia indicating that the operational event 306 corresponds to a branch miss prediction. Responsive to receiving the event signal 304, the interrupt circuit 308 generates the interrupt signal 312 including the operational event indicia, and provides the interrupt signal 312 to the clock control circuit 320. The clock control circuit 320 accesses the entry 318(0)-318(N) of the operational event-frequency table 316 corresponding to the operational event indicia, and determines that the target frequency ($f_T$) of the branch miss prediction is five hundred (500) MHz. However, the corresponding operating frequency ($f_{OP}$) is one giga-Hertz (1 GHz). Thus, to reduce or avoid a supply voltage droop corresponding to the branch miss prediction, the clock control circuit 320 generates the clock frequency adjustment signal 322 to cause the clock generator 324 to swallow every other pulse of the clock signal CLK to adjust the clock signal CLK to the target frequency ($f_T$) of 500 MHz.

Figure 5:
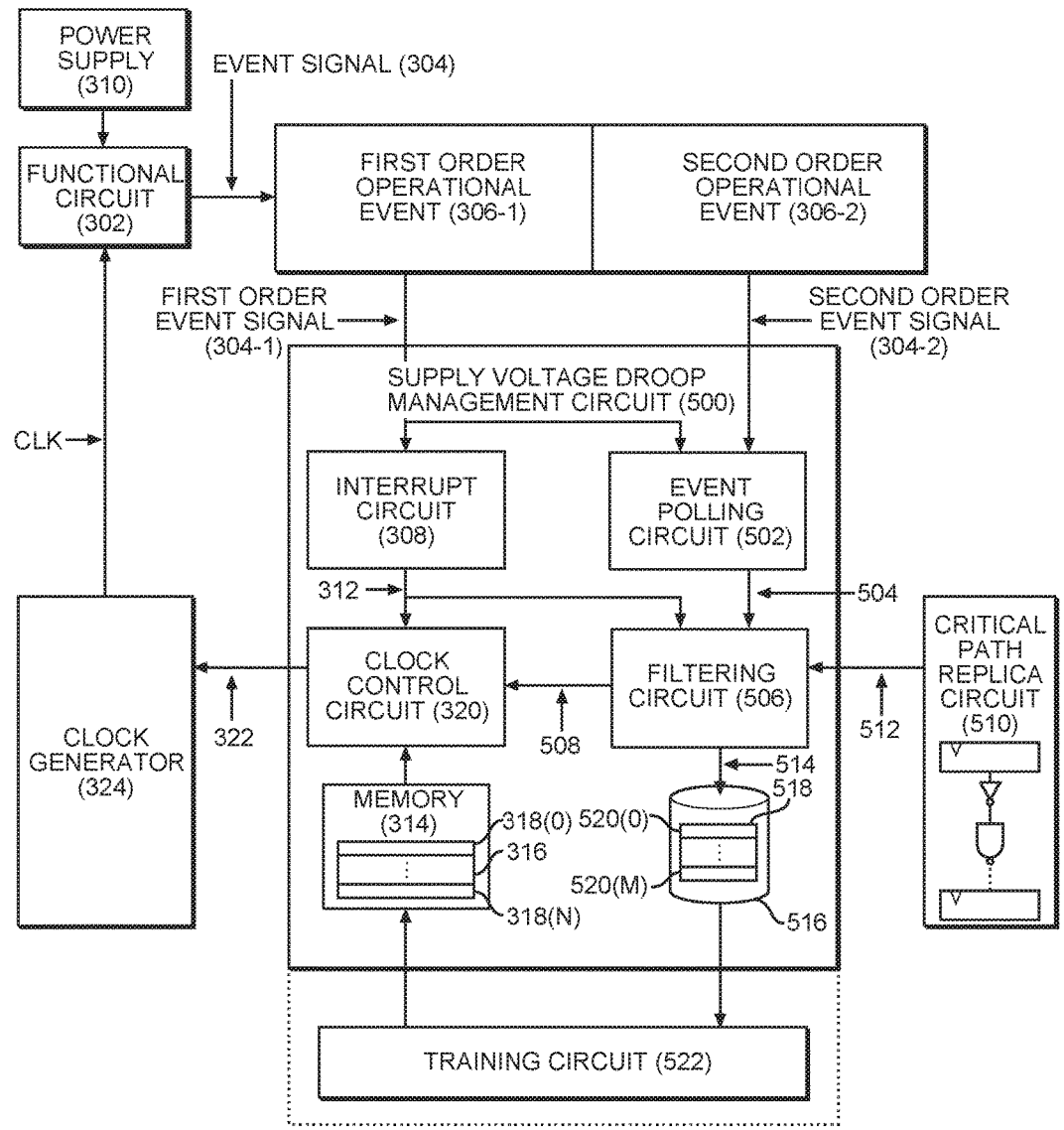
FIG. 5 is a block diagram of another exemplary supply voltage droop management circuit configured to reduce or avoid supply voltage droops in a functional circuit in response to an event signal corresponding to an operational event.

In addition to the supply voltage droop management circuit 300 in FIG. 3, other aspects can include additional elements that take advantage of the regularity and/or predictability with which some operational events corresponding to increased load current demand occur in a functional circuit. In this regard, FIG. 5 illustrates another exemplary supply voltage droop management circuit 500 configured to reduce or avoid supply voltage droops in the functional circuit 302 in response to an event signal 304 corresponding to an operational event 306. The supply voltage droop management circuit 500 includes certain common components with the supply voltage droop management circuit 300 in FIG. 3 as shown by common element numbers between FIGS. 3 and 5, and thus will not be re-described herein.

With continuing reference to FIG. 5, the supply voltage droop management circuit 500 is configured to receive the event signals 304 that include first order event signals 304-1 and second order event signals 304-2. In this manner, a first order event signal 304-1 corresponds to a first order operational event 306-1 that corresponds to a current (I) provided by the power supply 310 at a first frequency ($f_1$). A second order event signal 304-2 corresponds to a second order operational event 306-2 that corresponds to a current provided by the power supply 310 at a second frequency ($f_2$) that is lower than the first frequency ($f_1$). For example, the first frequency ($f_1$) can result in the first order operational event 306-1 causing a supply voltage droop over the course of less than ten (10) ns, while the second frequency ($f_2$) can result in the second order operational event 306-2 causing a supply voltage droop over the course of 10 s of nanoseconds (ns). In this manner, the supply voltage droop management circuit 500 has less time to reduce or avoid a supply voltage droop corresponding to a first order operational event 306-1 compared to a second order operational event 306-2. As non-limiting examples, an exemplary first order operational event 306-1 can include a branch miss prediction, private cache miss, vector instruction, or execution unit utilization. Further, an exemplary second order operational event 306-2 can include a last level cache miss, table look aside buffer miss, wakeup interrupt, or sleep event.

With continuing reference to FIG. 5, the interrupt circuit 308 is configured to receive the first order event signals 304-1 corresponding to first order operational events 306-1. Similar to the supply voltage droop management circuit 300 in FIG. 3, the interrupt circuit 308 generates the interrupt signal 312 in response to receiving the first order event signal 304-1. The interrupt signal 312 causes the clock control circuit 320 to prompt the clock generator 324 to adjust the clock signal CLK to the target frequency ($f_T$). In this manner, the interrupt circuit 308 is configured to respond to first order operational events 306-1 such that the interrupt circuit 308 can address the occurrence of the first order operational events 306-1 to reduce or avoid associated supply voltage droops within a time-frame consistent with the first frequency ($f_1$).

With continuing reference to FIG. 5, the supply voltage droop management circuit 500 also includes an event polling circuit 502. Rather than receiving the first order event signal 304-1 like the interrupt circuit 308, the event polling circuit 502 is configured to poll the functional circuit 302 at a defined polling rate. For example, the event polling circuit 502 can be configured to use polling to determine whether an event signal 304 corresponding to an operational event 306 has been generated in the most recent X number of cycles of the clock signal CLK. In this manner, the event polling circuit 502 determines whether the functional circuit 302 generates an event signal 304 corresponding to an operational event 306 within the defined polling time. In this example, the event polling circuit 502 is configured to poll both the first order event signal 304-1 and the second order event signal 304-2. In response to determining that the functional circuit 302 has generated the event signal 304 within the defined polling time, the event polling circuit 502 is configured to generate a polling event signal 504. A polling event signal 504 can include operational event indicia identifying the corresponding operational event 306, such as an event type indicating the type of operational event 306, an event location identifying the element in the functional circuit 302 in which the operational event 306 is or will occur, and an event clock time identifying a cycle of the clock signal CLK in which the event signal 304 is generated.

With continuing reference to FIG. 5, the supply voltage droop management circuit 500 also includes a filtering circuit 506 configured to receive the polling event signal 504. In response to receiving the polling event signal 504, the filtering circuit 506 is configured to generate a polling adjustment signal 508 that can include information such as operational event indicia identifying the operational event 306 corresponding to the event signal 304 of the polling event signal 504. The clock control circuit 320 is configured to receive the polling adjustment signal 508 and access the operational event-frequency table 316 to determine the target frequency ($f_T$) corresponding to the operational event 306 identified by operational event indicia. Further, the clock control circuit 320 is configured to generate the clock frequency adjustment signal 322 to cause the clock generator 324 to adjust the frequency of the clock signal CLK to the target frequency ($f_T$). In this manner, the event polling circuit 502 can be used in conjunction with the filtering circuit 506 to adjust the clock signal CLK to reduce or avoid supply voltage droops. Additionally, because the event polling circuit 502 polls the functional circuit 302 for a first order event signal 304-1 and a second order event signal 304-2, the event polling circuit 502 and the filtering circuit 506 enable the supply voltage droop management circuit 500 to reduce or avoid supply voltage droops corresponding to a first order operational event 306-1 similar to the interrupt circuit 308, as well as a second order operational event 306-2.

With continuing reference to FIG. 5, in addition to the clock adjustment function described above, the filtering circuit 506 also enables the supply voltage droop management circuit 500 to learn details of an operational event 306 so as to improve supply voltage droop reduction and avoidance. In this regard, the filtering circuit 506 is configured to receive the interrupt signal 312 in addition to receiving the polling event signal 504. Further, the filtering circuit 506 is configured to communicate with a critical path replica circuit 510 that replicates a critical path of the functional circuit 302. The filtering circuit 506 is configured to receive a timing error signal 512 from the critical path replica circuit 510 that provides timing data related to timing of an operational event 306 in the functional circuit 302 at particular frequencies of the clock signal CLK. In this manner, the filtering circuit 506 uses the operational event indicia from the received interrupt signal 312 or the polling event signal 504 in conjunction with the timing error signal 512 to generate a training signal 514. The training signal 514 can include operational event indicia that indicate information such as event type, event location, event clock time, and timing data of the corresponding operational event 306. In particular, the timing data indicates whether the operational event 306 relates to any timing errors generated in the critical path replica circuit 510.

With continuing reference to FIG. 5, the supply voltage droop management circuit 500 also includes a second memory 516 to which the filtering circuit 506 is configured to provide the training signal 514. In this manner, the second memory 516 includes an event log table 518 having multiple entries 520(0)-520(M) that store the operational event indicia and the timing data of the training signal 514. Further, a training circuit 522 is configured to access the event log table 518 to retrieve the stored operational event indicia and the timing data. The training circuit 522 is further configured to use such information to learn particular target frequencies ($f_T$) corresponding to operational events 306 that occur within certain elements of the functional circuit 302 at particular times or in a particular pattern. The training circuit 522 is further configured to update the entries 318(0)-318(N) in the operational event-frequency table 316 based on such determinations. In this manner, the training circuit 522 can be used to learn details of the operational event 306 of the functional circuit 302, such as the frequency at which such an operational event 306 occurs and the corresponding target frequency ($f_T$) that is most effective at reducing or avoiding a corresponding supply voltage droop. Thus, the training circuit 522 can help tune the supply voltage droop management circuit 500 such that adjustments to the clock signal CLK are adapted to particular design and timing features of the functional circuit 302. Further, although the training circuit 522 is employed separately from the supply voltage droop management circuit 500 in this aspect, other aspects may employ the training circuit 522 and the supply voltage droop management circuit 500 on the same die.

Figure 6A:
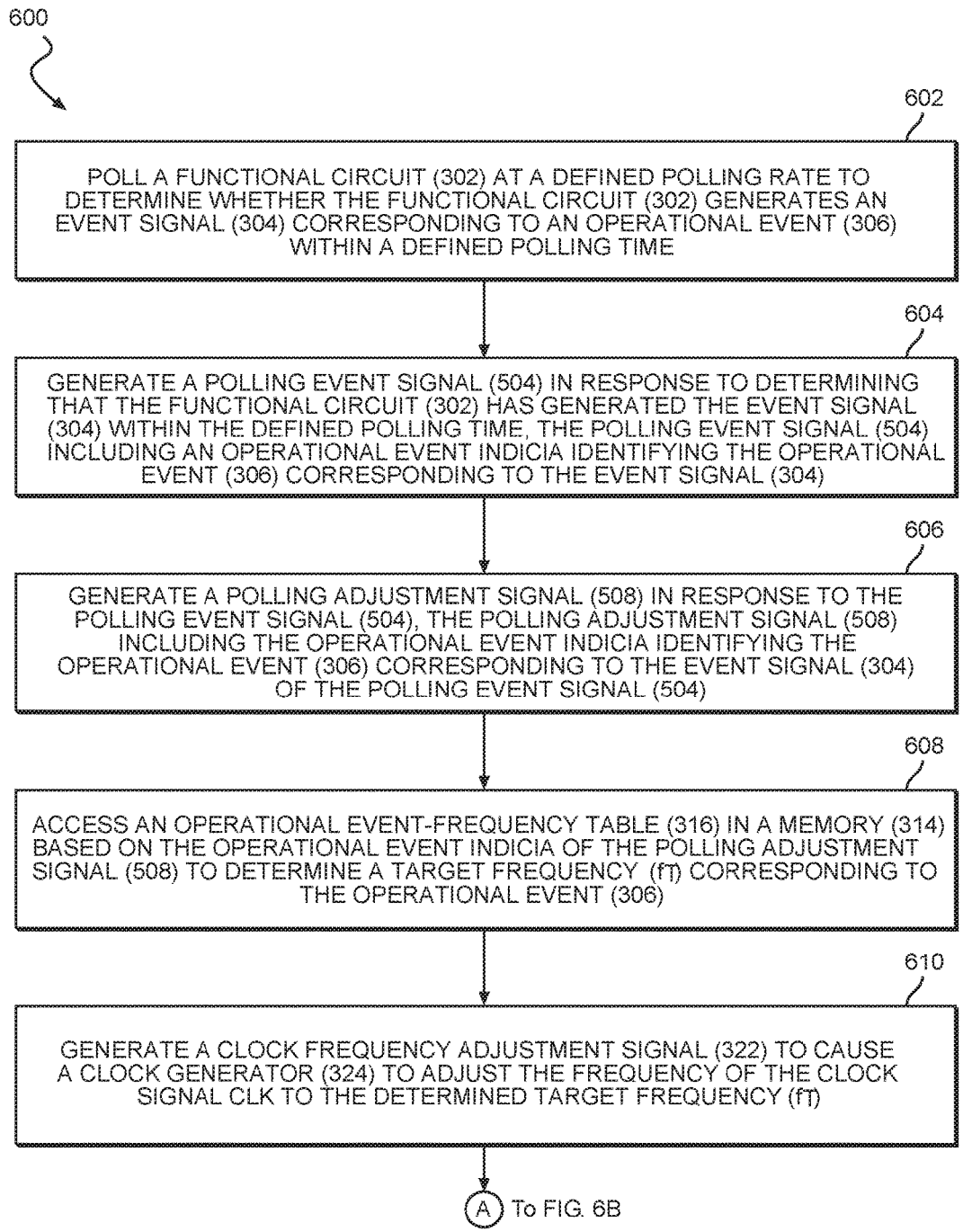
FIGS. 6A and 6B are a flowchart illustrating an exemplary process employed by the supply voltage droop management circuit in FIG. 5 for reducing or avoiding supply voltage droops in the functional circuit.
Figure 6B:
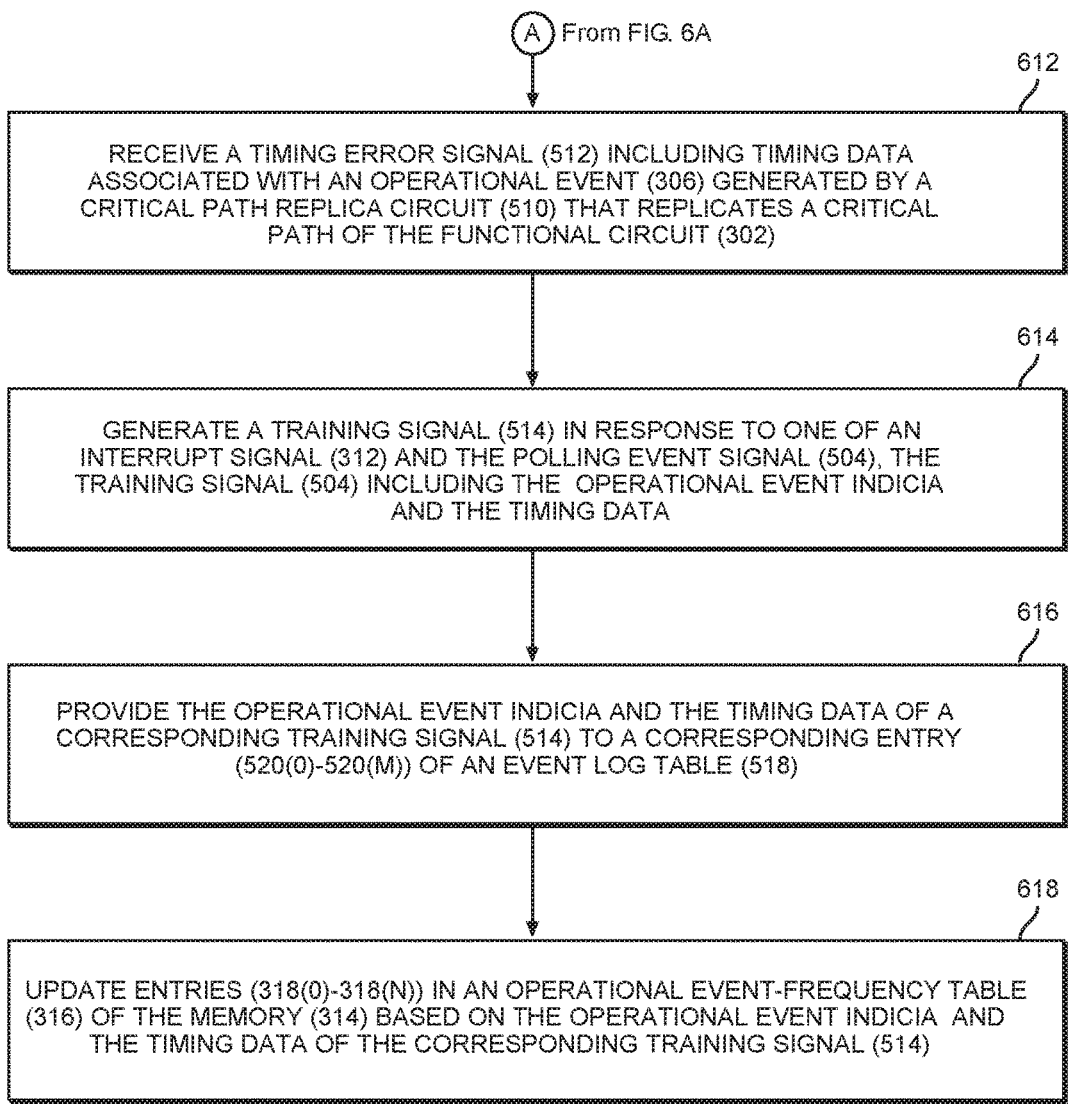

FIGS. 6A-6B illustrate an exemplary process 600 for reducing or avoiding supply voltage droop using the supply voltage droop management circuit 500 in FIG. 5. Although not illustrated, the process 600 also includes the steps described for the process 400 in FIG. 4. In this manner, the illustrated portion of the process 600 describes steps included in the process 600 that are in addition to the steps described in the process 400.

With continuing reference to FIG. 6A, the process 600 includes the event polling circuit 502 polling the functional circuit 302 at a defined polling rate to determine whether the functional circuit 302 generates an event signal 304 corresponding to an operational event 306 within the defined polling time (block 602). The process 600 also includes the event polling circuit 502 generating the polling event signal 504 in response to determining that the functional circuit 302 has generated the event signal 304 within the defined polling time (block 604). As described above, the polling event signal 504 includes the operational event indicia identifying the operational event 306 corresponding to the event signal 304. The process 600 also includes the filtering circuit 506 generating the polling adjustment signal 508 in response to the polling event signal 504 (block 606). As described above, the polling adjustment signal 508 includes the operational event indicia identifying the operational event 306 corresponding to the event signal 304 of the polling event signal 504. Additionally, the process 600 includes the clock control circuit 320 accessing the operational event-frequency table 316 in the memory 314 based on the operational event indicia of the polling adjustment signal 508 to determine the target frequency ($f_T$) corresponding to the operational event 306 (block 608). Further, the process 600 includes the clock control circuit 320 generating the clock frequency adjustment signal 322 to cause the clock generator 324 to adjust the frequency of the clock signal CLK to the determined target frequency ($f_T$) (block 610).

In addition to adjusting the clock signal CLK, the process 600 also includes steps illustrated in FIG. 6B to tune the supply voltage droop management circuit 500 such that adjustments to the clock signal CLK are adapted to particular design and timing features of the functional circuit 302. Although the steps in FIG. 6B are illustrated following block 610 in FIG. 6A, the following steps are not limited to being performed in the illustrated order. In this manner, with reference to FIG. 6B, the process 600 also includes the filtering circuit 506 receiving the timing error signal 512 including timing data associated with an operational event 306 generated by the critical path replica circuit 510 that replicates the critical path of the functional circuit 302 (block 612). Further, the process 600 includes the filtering circuit 506 generating the training signal 514 in response to one of the interrupt signal 312 and the polling event signal 504 (block 614). As described above, the training signal 514 includes the operational event indicia identifying the operational event 306 corresponding to the received interrupt signal 312 or polling event signal 504, as well as timing data from the timing error signal 512. Further, the process 600 includes the filtering circuit 506 providing the operational event indicia and the timing data of the corresponding training signal 514 to a corresponding entry 520(0)-520(M) in the event log table 518 (block 616). The process 600 also includes the training circuit 522 updating entries 318(0)-318(N) in the operational event-frequency table 316 of the memory 314 based on the operational event indicia and the timing data of the corresponding training signal 514 (block 618). In this manner, the process 600 can reduce or avoid supply voltage droops caused by operational events 306, while also tuning the supply voltage droop management circuit 500 such that adjustments to the clock signal CLK are adapted to particular design and timing features of the functional circuit 302.

Figure 7:
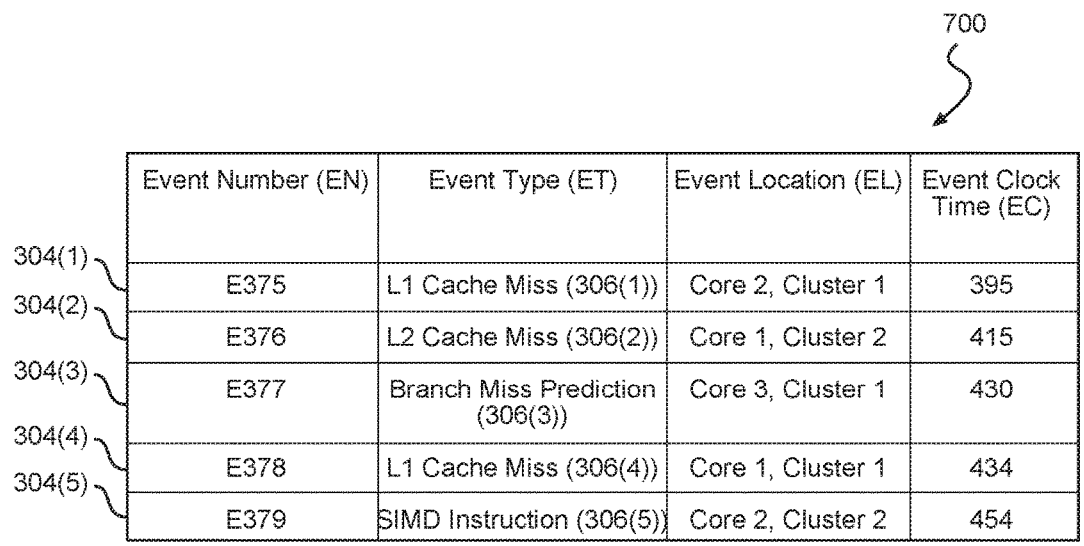
FIG. 7 is a diagram of an exemplary set of event signals received by the supply voltage droop management circuit in FIG. 5.

Turning to details of signals that play a role in adjusting the clock signal CLK to reduce or avoid supply voltage droops, FIG. 7 illustrates an exemplary set 700 of event signals 304(1)-304(5) that can be received by the supply voltage droop management circuit 500 in FIG. 5. As illustrated in FIG. 7, the operational event indicia of each event signal 304(1)-304(5) can include multiple elements of information. As a non-limiting example, the operational event indicia of the event signals 304(1)-304(5) includes an event number (EN) that indicates where in the sequence of operational events 306(1)-306(5) the event signal 304 falls, and an event type (ET) indicating the function of the operational events 306(1)-306(5). The operational event indicia can further include an event location (EL) indicating where in the functional circuit 302 the corresponding operational event 306(1)-306(5) occurs, and an event clock time (EC) indicating on which cycle of the clock signal CLK the corresponding operational event 306(1)-306(5) begins. For example, the operational event indicia of the event signal 304(1) indicates that the corresponding operational event 306(1) is numbered "E375" and is an "L1 Cache Miss." The operational indicia of the event signal 304(1) further indicates that the "L1 Cache Miss" occurs in "Cluster 1" of "Core 2," and begins on cycle "395" of the clock signal CLK. Similar information is listed for the event signals 304(2)-304(5).

Figure 8:
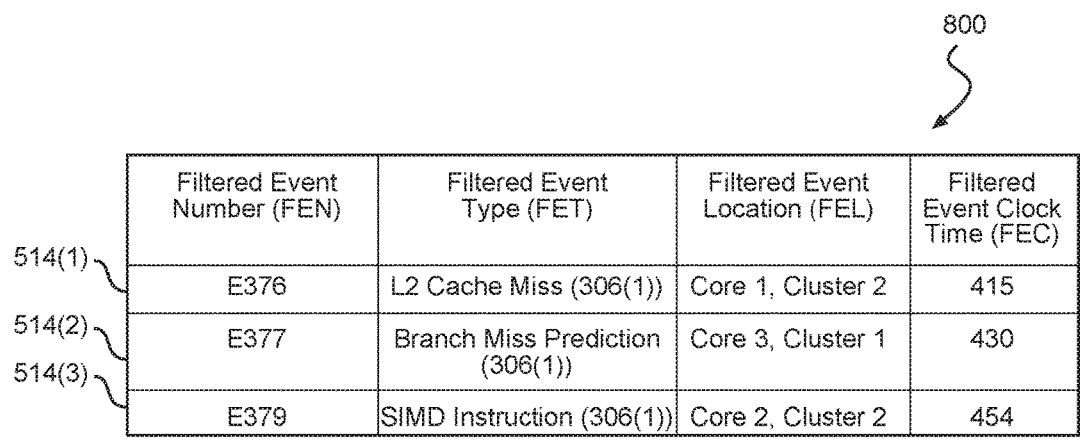
FIG. 8 is a diagram of an exemplary set of training signals generated by a filtering circuit in FIG. 5.

Additionally, FIG. 8 illustrates an exemplary set 800 of training signals 514(1)-514(3) generated by the filtering circuit 506 in FIG. 5. In this example, the training signals 514(1)-514(3) include training information that is similar to the operational event indicia of the event signals 304(1)-304(5) in FIG. 7. However, the training signals 514(1)-514

(3) are generated by filtering out the event signals 304(1)-304(5) that include the Event Type (ET) "L1 Cache Miss" such that less data is stored in event log table 518. Generating the training signals 514(1)-514(3) in this manner enables the event log table 518 to store useful information for training purposes, while filtering out information a designer has determined to be less important for tuning the supply voltage droop management circuit 500. For example, the training data of the training signal 514(1) includes a filtered event number (FEN) "E376," and a filtered event type (FET) of "L2 Cache Miss." Further, the training data of the training signal 514(1) includes a filtered event location (FEL) of "Cluster 2" in "Core 1," and a filtered event clock time (FEC) of "415." Similar information is listed for the training signals 514(2), 514(3). In this manner, such training data can be used by the training circuit 522 to generate the target frequency ($f_T$) that corresponds to each operational event 306, while avoiding performing such training for the less critical event signals 304(1), 304(4).

The elements described herein are sometimes referred to as means for performing particular functions. In this regard, the interrupt circuit 308 is sometimes referred to herein as "a means for receiving an event signal generated by a functional circuit operating based on a clock signal at an operating frequency, the event signal corresponding to an operational event in the functional circuit that increases a load current demand to a power supply powering the functional circuit sufficient to cause a supply voltage droop in the power supply at the operating frequency." The interrupt circuit 308 is also sometimes referred to herein as "a means for generating an interrupt signal in response to the received event signal, the interrupt signal comprising an operational event indicia identifying the operational event corresponding to the event signal." The memory 314 is sometimes referred to herein as "a means for storing a plurality of entries, each comprising a target frequency corresponding to the operational event corresponding to the event signal, such that the load current demand on the power supply by the functional circuit reduces the supply voltage droop of the power supply when the functional circuit operates at the target frequency." The clock control circuit 320 is sometimes referred to "a means for receiving the interrupt signal comprising the operational event indicia corresponding to the operational event of the received event signal." The clock control circuit 320 is also sometimes referred to herein as "a means for accessing the means for storing based on the operational event indicia of the interrupt signal to determine the target frequency corresponding to the operational event." The clock control circuit 320 is also sometimes referred to herein as "a means for generating a clock frequency adjustment signal to cause a clock generator to adjust a frequency of the clock signal to the determined target frequency."

The supply voltage droop management circuits for reducing or avoiding supply voltage droops according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 9:
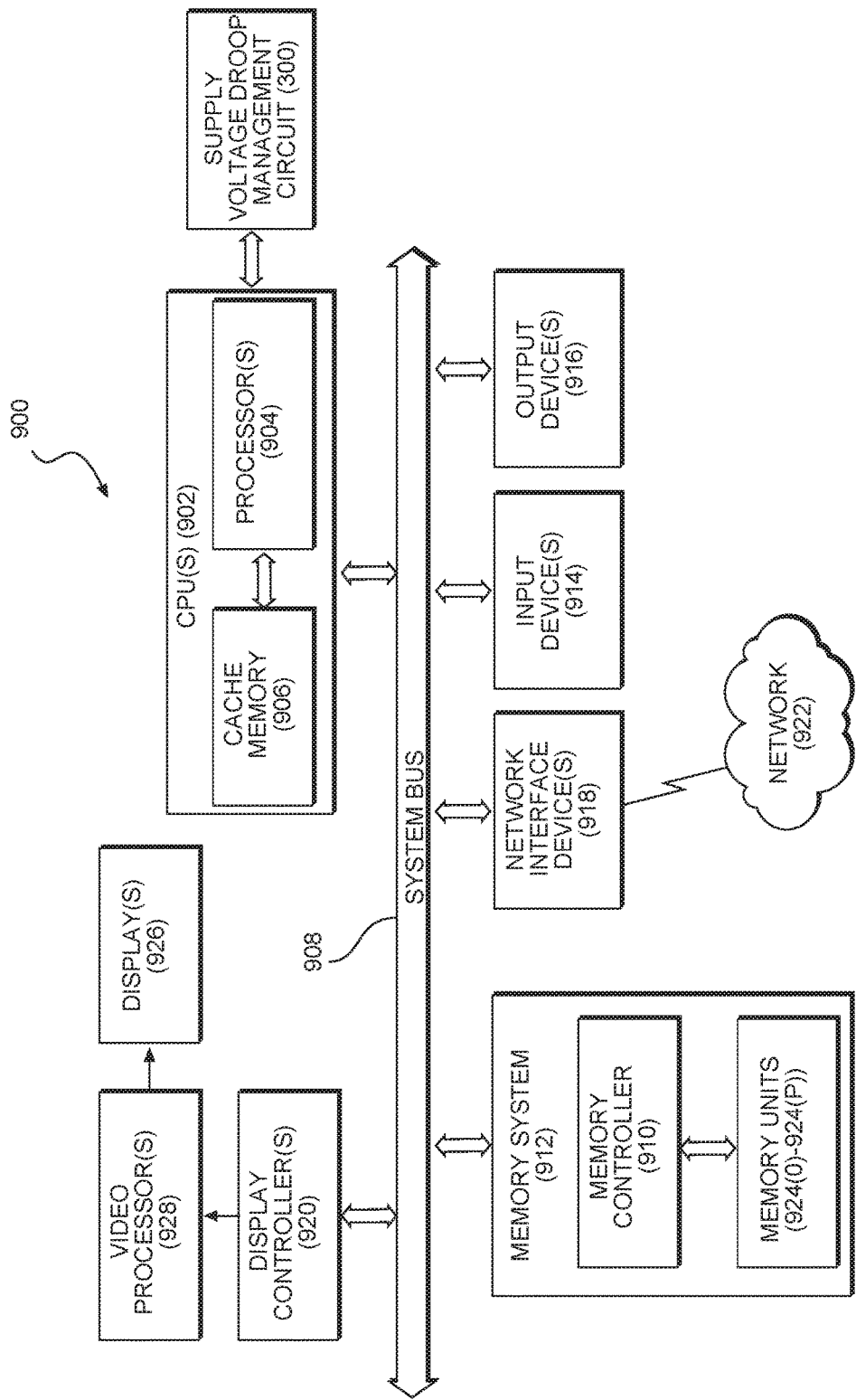
FIG. 9 is a block diagram of an exemplary processor-based system that can include the supply voltage droop management circuits of FIGS. 3 and 5.

In this regard, FIG. 9 illustrates an example of a processor-based system 900 that can employ supply voltage droop management circuit 300 in FIG. 3. Further, although not illustrated, the processor-based system 900 can employ the supply voltage droop management circuit 500 in FIG. 5 in place of the supply voltage droop management circuit 300. In this example, the processor-based system 900 includes one or more central processing units (CPUs) 902, each including one or more processors 904. As illustrated in FIG. 9, the CPU(s) 902 communicates with the supply voltage droop management circuit 300. The CPU(s) 902 may have cache memory 906 coupled to the processor(s) 904 for rapid access to temporarily stored data. The CPU(s) 902 is coupled to a system bus 908 and can intercouple master and slave devices included in the processor-based system 900. As is well known, the CPU(s) 902 communicates with these other devices by exchanging address, control, and data information over the system bus 908. For example, the CPU(s) 902 can communicate bus transaction requests to a memory controller 910 as an example of a slave device. Although not illustrated in FIG. 9, multiple system buses 908 could be provided, wherein each system bus 908 constitutes a different fabric.

Other master and slave devices can be connected to the system bus 908. As illustrated in FIG. 9, these devices can include a memory system 912, one or more input devices 914, one or more output devices 916, one or more network interface devices 918, and one or more display controllers 920, as examples. The input device(s) 914 can include any type of input device, including, but not limited to, input keys, switches, voice processors, etc. The output device(s) 916 can include any type of output device, including, but not limited to, audio, video, other visual indicators, etc. The network interface device(s) 918 can be any device configured to allow exchange of data to and from a network 922. The network 922 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 918 can be configured to support any type of communications protocol desired. The memory system 912 can include one or more memory units 924(0)-924(P).

The CPU(s) 902 may also be configured to access the display controller(s) 920 over the system bus 908 to control information sent to one or more displays 926. The display controller(s) 920 sends information to the display(s) 926 to be displayed via one or more video processors 928, which process the information to be displayed into a format suitable for the display(s) 926. The display(s) 926 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A supply voltage droop management circuit, comprising:
   an interrupt circuit configured to:
      receive an event signal generated by a functional circuit operating based on a clock signal at an operating frequency, the event signal corresponding to an operational event in the functional circuit that increases a load current demand to a power supply powering the functional circuit sufficient to cause a supply voltage droop in the power supply at the operating frequency; and
      generate an interrupt signal in response to the received event signal, the interrupt signal comprising an operational event indicia identifying the operational event corresponding to the event signal;
   a memory comprising an operational event-frequency table comprising a plurality of entries, each entry comprising a target frequency corresponding to the operational event corresponding to the event signal, wherein the load current demand on the power supply by the functional circuit reduces the supply voltage droop of the power supply when the functional circuit operates at the target frequency; and
   a clock control circuit configured to:
      receive the interrupt signal comprising the operational event indicia corresponding to the operational event of the received event signal;
      access the operational event-frequency table in the memory based on the operational event indicia of the interrupt signal to determine the target frequency corresponding to the operational event; and
      generate a clock frequency adjustment signal to cause a clock generator to adjust a frequency of the clock signal to the determined target frequency.

2. The supply voltage droop management circuit of claim 1, further comprising:
   an event polling circuit configured to:
      poll the functional circuit at a defined polling rate to determine whether the functional circuit generates an event signal corresponding to an operational event within a defined polling time; and
      generate a polling event signal in response to determining that the functional circuit has generated the event signal within the defined polling time, the polling event signal comprising an operational event indicia identifying the operational event corresponding to the event signal.

3. The supply voltage droop management circuit of claim 2, further comprising:
   a filtering circuit configured to:
      receive the interrupt signal;
      receive the polling event signal;
      receive a timing error signal comprising timing data associated with an operational event generated by a critical path replica circuit that replicates a critical path of the functional circuit;
      generate a polling adjustment signal in response to the polling event signal, the polling adjustment signal comprising the operational event indicia identifying the operational event corresponding to the event signal of the polling event signal; and
      generate a training signal in response to one of the interrupt signal and the polling event signal, the training signal comprising the operational event indicia and the timing data; and the clock control circuit further configured to:
receive the polling adjustment signal;
access the operational event-frequency table in the memory based on the operational event indicia of the polling adjustment signal to determine the target frequency corresponding to the operational event; and
generate the clock frequency adjustment signal to cause the clock generator to adjust the frequency of the clock signal to the determined target frequency.

4. The supply voltage droop management circuit of claim 3, further comprising:
a second memory comprising an event log table comprising a plurality of entries, each entry comprising the operational event indicia and the timing data of a corresponding training signal;
the filtering circuit further configured to provide the operational event indicia and the timing data to a corresponding entry of the event log table; and
wherein a training circuit is configured to:
access the event log table in the second memory to retrieve the operational event indicia and the timing data of the corresponding training signal; and
update the plurality of entries in the operational event-frequency table of the memory based on the operational event indicia and the timing data of the corresponding training signal.

5. The supply voltage droop management circuit of claim 2, wherein:
the event signal comprises a first order event signal corresponding to a first order operational event, wherein the first order operational event corresponds to a current provided by the power supply at a first frequency;
the interrupt circuit is further configured to receive the first order event signal; and
the event polling circuit is further configured to poll the functional circuit at the defined polling rate to determine whether the functional circuit generates the first order event signal within the defined polling time.

6. The supply voltage droop management circuit of claim 5, wherein:
the event signal further comprises a second order event signal corresponding to a second order operational event, wherein the second order operational event corresponds to a current provided by the power supply at a second frequency that is lower than the first frequency; and
the event polling circuit is further configured to poll the functional circuit at the defined polling rate to determine whether the functional circuit generates the second order event signal within the defined polling time.

7. The supply voltage droop management circuit of claim 6, wherein each first order operational event corresponds to one of a branch miss prediction, a private cache miss, a vector instruction, and an execution unit utilization.

8. The supply voltage droop management circuit of claim 7, wherein each second order operational event corresponds to one of a last level cache miss, a table look aside buffer miss, a wakeup interrupt, and a sleep event.

9. The supply voltage droop management circuit of claim 1, wherein the clock control circuit is configured to generate the clock frequency adjustment signal to cause the clock generator to stretch one or more cycles of the clock signal.

10. The supply voltage droop management circuit of claim 1, wherein the clock control circuit is configured to generate the clock frequency adjustment signal to cause the clock generator to swallow one or more cycles the clock signal.

11. The supply voltage droop management circuit of claim 1, wherein the event signal corresponds to a future operational event.

12. The supply voltage droop management circuit of claim 1 integrated into an integrated circuit (IC).

13. The supply voltage droop management circuit of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a server; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

14. A supply voltage droop management circuit, comprising:
a means for receiving an event signal generated by a functional circuit operating based on a clock signal at an operating frequency, the event signal corresponding to an operational event in the functional circuit that increases a load current demand to a power supply powering the functional circuit sufficient to cause a supply voltage droop in the power supply at the operating frequency;
a means for generating an interrupt signal in response to the received event signal, the interrupt signal comprising an operational event indicia identifying the operational event corresponding to the event signal;
a means for storing a plurality of entries, each comprising a target frequency corresponding to the operational event corresponding to the event signal, wherein the load current demand on the power supply by the functional circuit reduces the supply voltage droop of the power supply when the functional circuit operates at the target frequency;
a means for receiving the interrupt signal comprising the operational event indicia corresponding to the operational event of the received event signal;
a means for accessing the means for storing based on the operational event indicia of the interrupt signal to determine the target frequency corresponding to the operational event; and
a means for generating a clock frequency adjustment signal to cause a clock generator to adjust a frequency of the clock signal to the determined target frequency.

15. A method for reducing or avoiding supply voltage droop in a functional circuit, comprising:
receiving an event signal generated by a functional circuit operating based on a clock signal at an operating frequency, the event signal corresponding to an operational event in the functional circuit that increases a load current demand to a power supply powering the functional circuit sufficient to cause a supply voltage droop in the power supply at the operating frequency;
generating an interrupt signal in response to the received event signal, the interrupt signal comprising an operational event indicia identifying the operational event corresponding to the event signal;

responsive to the interrupt signal, accessing a target frequency from an entry of a plurality of entries based on the operational event indicia of the interrupt signal to determine the target frequency corresponding to the operational event, wherein the load current demand on the power supply by the functional circuit reduces the supply voltage droop of the power supply when the functional circuit operates at the target frequency; and generating a clock frequency adjustment signal to cause a clock generator to adjust a frequency of the clock signal to the determined target frequency.

16. The method of claim 15, further comprising:

polling the functional circuit at a defined polling rate to determine whether the functional circuit generates an event signal corresponding to an operational event within a defined polling time; and generating a polling event signal in response to determining that the functional circuit has generated the event signal within the defined polling time, the polling event signal comprising an operational event indicia identifying the operational event corresponding to the event signal.

17. The method of claim 16, further comprising:

receiving a timing error signal comprising timing data associated with an operational event generated by a critical path replica circuit that replicates a critical path of the functional circuit;

generating a polling adjustment signal in response to the polling event signal, the polling adjustment signal comprising the operational event indicia identifying the operational event corresponding to the event signal of the polling event signal; and generating a training signal in response to one of the interrupt signal and the polling event signal, the training signal comprising the operational event indicia and the timing data;

accessing an operational event-frequency table in a memory based on the operational event indicia of the polling adjustment signal to determine the target frequency corresponding to the operational event; and generating the clock frequency adjustment signal to cause the clock generator to adjust the frequency of the clock signal to the determined target frequency.

18. The method of claim 17, further comprising:

providing the operational event indicia and the timing data of a corresponding training signal to a corresponding entry of an event log table; and updating the plurality of entries in the operational event-frequency table of the memory based on the operational event indicia and the timing data of the corresponding training signal.

19. A processor-based system, comprising:

a central processing unit (CPU) comprising a processor;

a clock generator configured to generate a clock signal for clocking the CPU;

a supply voltage droop management circuit, comprising:

an interrupt circuit configured to:

receive an event signal generated by the CPU operating based on the clock signal at an operating frequency, the event signal corresponding to an operational event in the CPU that increases a load current demand to a power supply powering the CPU sufficient to cause a supply voltage droop in the power supply at the operating frequency; and generate an interrupt signal in response to the received event signal, the interrupt signal comprising an operational event indicia identifying the operational event corresponding to the event signal;

a memory comprising an operational event-frequency table comprising a plurality of entries, each entry comprising a target frequency corresponding to the operational event corresponding to the event signal, wherein the load current demand on the power supply by the CPU reduces the supply voltage droop of the power supply when the CPU operates at the target frequency;

a clock control circuit configured to:

receive the interrupt signal comprising the operational event indicia corresponding to the operational event of the received event signal;

access the operational event-frequency table in the memory based on the operational event indicia of the interrupt signal to determine the target frequency corresponding to the operational event; and generate a clock frequency adjustment signal to cause the clock generator to adjust a frequency of the clock signal to the determined target frequency.

20. The processor-based system of claim 19, wherein the supply voltage droop management circuit further comprises:

an event polling circuit configured to:

poll the CPU at a defined polling rate to determine whether the CPU generates an event signal corresponding to an operational event within a defined polling time; and generate a polling event signal in response to determining that the CPU has generated the event signal within the defined polling time, the polling event signal comprising an operational event indicia identifying the operational event corresponding to the event signal.

21. The processor-based system of claim 20, wherein the supply voltage droop management circuit further comprises:

a filtering circuit configured to:

receive the interrupt signal;

receive the polling event signal;

receive a timing error signal comprising timing data associated with an operational event generated by a critical path replica circuit that replicates a critical path of the CPU;

generate a polling adjustment signal in response to the polling event signal, the polling adjustment signal comprising the operational event indicia identifying the operational event corresponding to the event signal of the polling event signal; and generate a training signal in response to one of the interrupt signal and the polling event signal, the training signal comprising the operational event indicia and the timing data; and the clock control circuit further configured to:

receive the polling adjustment signal;

access the operational event-frequency table in the memory based on the operational event indicia of the polling adjustment signal to determine the target frequency corresponding to the operational event; and generate the clock frequency adjustment signal to cause the clock generator to adjust the frequency of the clock signal to the determined target frequency.

22. The processor-based system of claim 21, wherein:
the supply voltage droop management circuit further comprises:
   a second memory comprising an event log table comprising a plurality of entries, each comprising the operational event indicia and the timing data of a corresponding training signal; and
   the filtering circuit further configured to provide the operational event indicia and the timing data in a corresponding entry of the event log table; and
the processor-based system further comprises a training circuit configured to:
   access the event log table in the second memory to retrieve the operational event indicia and the timing data of the corresponding training signal; and
   update the plurality of entries in the operational event-frequency table of the memory based on the operational event indicia and the timing data of the corresponding training signal.

23. The processor-based system of claim 20, wherein:
the event signal comprises a first order event signal corresponding to a first order operational event, wherein the first order operational event corresponds to a current provided by the power supply at a first frequency;
the interrupt circuit is further configured to receive the first order event signal; and
the event polling circuit is further configured to poll the CPU at the defined polling rate to determine whether the CPU generates the first order event signal within the defined polling time.

24. The processor-based system of claim 23, wherein:
the event signal further comprises a second order event signal corresponding to a second order operational event, wherein the second order operational event corresponds to a current provided by the power supply at a second frequency that is lower than the first frequency; and
the event polling circuit is further configured to poll the CPU at the defined polling rate to determine whether the CPU generates the second order event signal within the defined polling time.

25. The processor-based system of claim 19, wherein the event signal corresponds to a future operational event.

* * * * *